Figure 1:
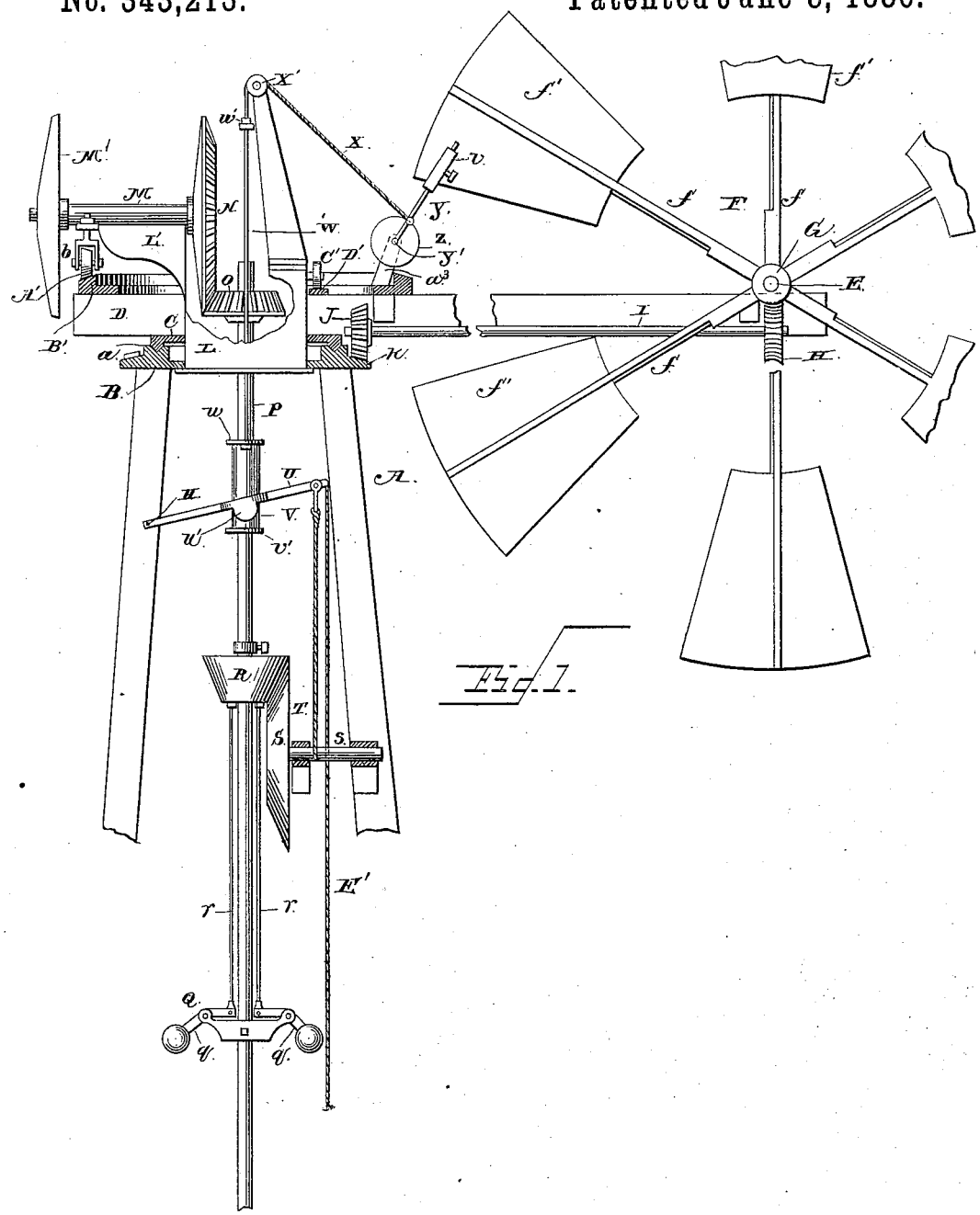

(No Model.) 2 Sheets—Sheet 1.

J. WARWICK.
WINDMILL.

No. 343,213. Patented June 8, 1886.

WITNESSES

INVENTOR
John Warwick
By C. A. Snow & Co.
his Attorney

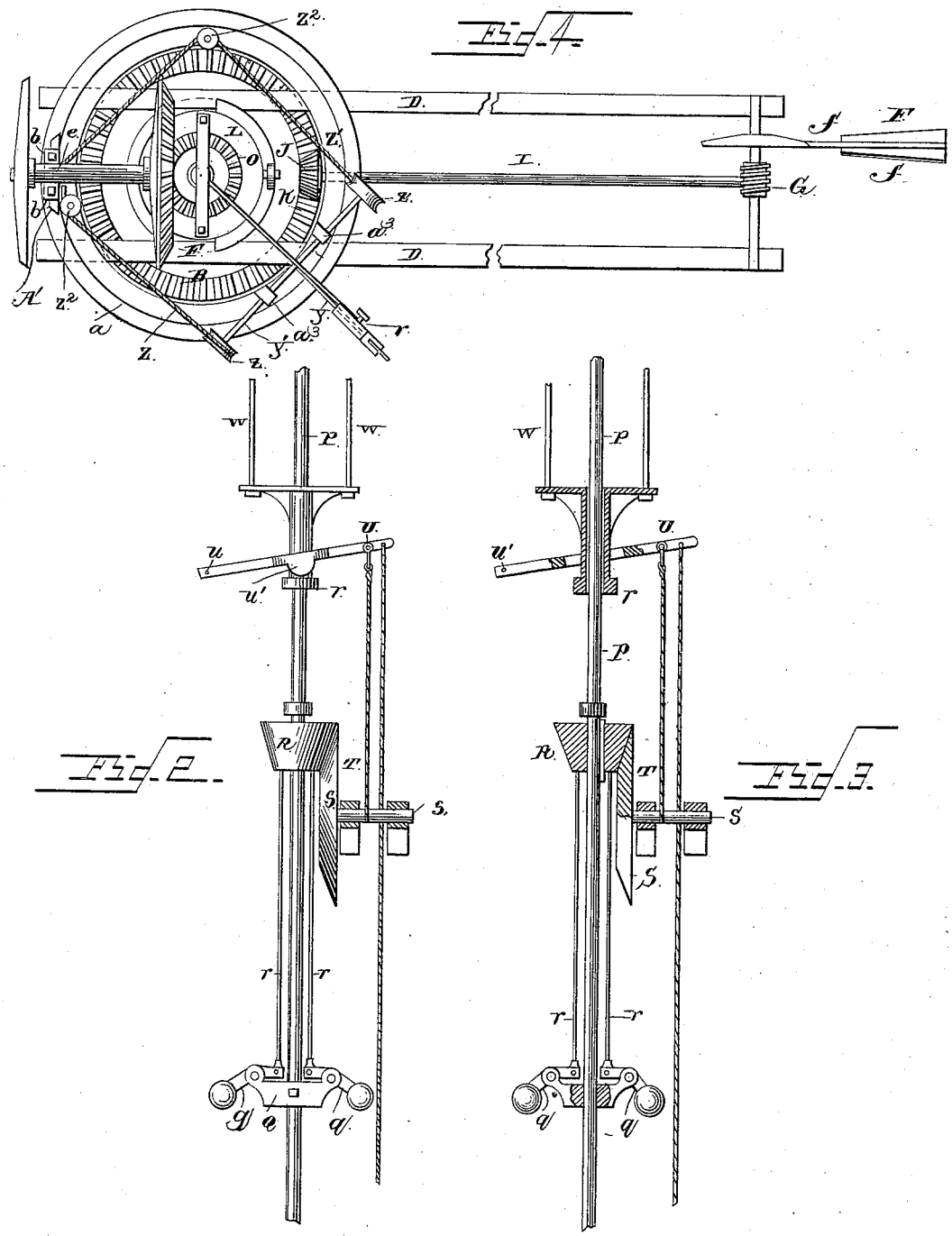

UNITED STATES PATENT OFFICE.

JOHN WARWICK, OF BELOIT, WISCONSIN.

WINDMILL.

SPECIFICATION forming part of Letters Patent No. 343,213, dated June 8, 1886.

Application filed September 21, 1885. Serial No. 177,712. (No model.)

*To all whom it may concern:*

Be it known that I, JOHN WARWICK, a citizen of the United States, residing at Beloit, in the county of Rock and State of Wisconsin, have invented a new and useful Improvement in Windmills, of which the following is a specification, reference being had to the accompanying drawings.

This invention relates to windmills, and especially to that class of the same known as "solid-wheel" windmills; and it has for its object to more thoroughly and perfectly regulate the movements and operation of the same.

To this end it consists in devices for permitting the fan-tail to rotate as the wind shifts, and thus regulate the position of the wind-wheel relative to the direction in which the wind is blowing; and it also consists in an improved governing device to regulate the speed of the wind-wheel.

To attain these objects, my invention consists in certain details of construction and combination of parts, as hereinafter set forth, and particularly pointed out in the claims.

In the accompanying drawings, Figure 1 is a side view, partly in section, of a solid-wheel windmill, showing my improved devices applied thereto. Fig. 2 is a view of the governing devices detached from the mill. Fig. 3 is a sectional view of the same, and Fig. 4 is a plan view of Fig. 1.

Like letters denote like parts in the several figures of the drawings.

Referring to the drawings, A designates a windmill-tower, which is of the ordinary construction, and is provided with a cap, B, secured to the top of the tower, said cap being formed with a track, $a$, in which the turn-table C works. The turn-table is rigidly secured to beams D D, two in number, which are connected at their outer ends by the shaft E of the fan-tail F. Said fan-tail is formed of radial arms $f$, provided with diagonally-disposed wings $f'$, and the shaft E of the fan-tail has secured thereon a worm, G, which meshes with a worm-gear, H, on the outer end of the shaft I, the latter being suitably supported by the beams D D. On the inner end of shaft I is a pinion, J, meshing with a circumferential series of teeth, K, secured to or formed with the cap B outside the track $a$. When full in the wind, the wind-wheel is at right angles to the wind, and as the wind shifts the fan-tail rotates, causing its shaft to turn the worm G, and through gear H, shaft I, pinion J, and gear-teeth K the fan-tail will be carried around out of the wind. The turning of the fan-tail out of the wind will, by means of the beams D and turn-table C, cause the wind-wheel to be carried around so as to face the wind. Thus the position of the wind-wheel will be regulated as the wind shifts.

L designates the windmill pivot, arranged between the beams D, and working through the turn-table C and cap B, said pivot being formed with an extended bracket, L', in which a shaft, M, is journaled, the latter carrying at the outer end the wind-wheel M'. A gear, N, is formed on or secured to the inner end of said shaft M and meshes with a gear, O, on the upper end of an upright shaft, P, the latter extending downward and connecting with the mechanism to be driven. A governor, Q, is mounted on the shaft P, and is provided with rods $r$, which connect the lever-arms $q$ of the governor with a friction-pulley, R, the latter running on a feather formed on the shaft P.

S designates a friction-wheel, secured on the end of a shaft, $s$, journaled in the tower-posts, and adapted to be engaged by the friction pulley R, the shaft of said friction-wheel having one end of a rope or chain, T, attached thereto. The other end of the rope or chain is attached to the free end of a lever, U, pivoted at H to the tower-posts, the lever being formed with an enlarged central portion, $u'$, inclosing a shipper, V, playing loosely up and down upon the shaft P. Thus the shipper is permitted to operate within the portion $u'$, while said portion is provided with downwardly-projecting lugs $v$, which bear against a rim, $v'$, on the lower end of the shipper. The shipper is formed on its upper edge with outward extensions $w$, to which are attached rods W W, which run through guides in or on the pivot L, said rods being connected at their upper ends by a cross-bar, $w'$, and being held by the guides in their position relatively with the pivot and the wind-wheel. To the cross-bar is attached a rope or chain, X, passing over a pulley, X', journaled to an upward extension of the pivot L, and passing downward so as to connect with a lever, Y, provided with a weight, the lever being secured to the center of a rock-shaft, Y', the rock-shaft having drums Z Z', connected at its outer ends. Attached to the pivot L and l are ropes z z', which are wound in opposite directions on the drums Z Z', and provided with pulleys Z², serving to guide the ropes.

It will be seen that when the rock-shaft Y' is turned one of the ropes is wound upon its pulley Z, while the other rope is unwound, and since the ropes are attached to the pivot L the latter will be pulled around, carrying the wind-wheel around also. The weight on the lever Y serves to rotate the rock-shaft in the opposite direction, and thus return the pivot to its former position.

The bracket L' is provided with a U-shaped hanger, b, having journaled therein wheel, A', which run on a circular track, B', secured to the beams D, thereby supporting the wheel end of the pivot. Another wheel, C', is secured to the pivot L and runs on a track, D', attached to the beams D, the wheel D' serving to steady the pivot at that end. A rope or chain, E', is also attached to the end of lever U and extends downward to the bottom of the mill-tower, and by means of the rope, operated through a windlass or otherwise, the windmill can be turned to "shut off the wheel from the wind," as it is termed, but more properly to turn the wheel edgewise to the wind. The governor Q need not be directly attached to the shaft P, but may be simply connected thereto and run by belt or gear from the same.

The operation of my invention can be readily understood from the foregoing description, taken in connection with the annexed drawings.

The wind-wheel is turned by the wind in the usual manner, and as the wind shifts the fan-tail is rotated, and through worm G, gear H, shaft I, pinion J, and gear-teeth K the fan-tail is carried around out of the wind. As the fan-tail is carried around, the beams D and pivot L will be brought around also, thus causing the wind-wheel to swing around so as to face the wind. By this means the position of the wind-wheel will be regulated according as the direction of the wind changes, and thus the wheel will always be full in the wind. As the speed of the wind increases, the shaft P will be revolved correspondingly, so that the balls of the governor Q will be extended by centrifugal force, thereby causing the friction-pulley R to come in contact with the friction-wheel S. The wheel S will be revolved by contact with the pulley, and will transmit motion to shaft s, winding the rope or chain T around the same, and as said rope is wound the free end of the lever U will be depressed or drawn down, causing the lugs v to bear against a rim, v', on the lower end of the shipper V, which is forced downward on the shaft P. The downward movement of the shipper will serve, through the rods W W, to draw the rope X over the pulley X', the rope raising the weighted lever Y, which will cause the rock-shaft Y', journaled in the track D, to revolve, thereby revolving the drums Z Z', likewise winding one of the ropes, z', upon its drum, the other rope, z, being unwound. The winding of the rope on the drum will cause the pivot to be brought partly around, the wheels A' running in the track B', while the wheel C' runs in the track D', thus allowing the wind-wheel to be forced partly out of the wind, thereby decreasing the speed thereof. As the speed decreases, the governor-balls will descend, removing the contact of friction-pulley R with the wheels S, the rope or chain F being unwound from the shaft s, the lever U raised, shipper V rising by the weighted lever Y drawing the rope X over the pulley X', and by the descent of said lever Y the rock-shaft is turned in the opposite direction, causing the drum Z to wind the cord or rope z, while the other rope, z', will be unwound, thus permitting the wind-wheel to return to its former position. By means of this governing device the speed of the wheel is regulated, so that when the speed increases above a certain point the governor will act in the manner stated to decrease the speed of the wheel.

The advantages of my improved regulating device will be obvious. They act with precision to regulate the position of the wind-wheel as the wind changes, while the speed will be regulated so as not to increase above a certain point.

A stop, F, is arranged in the beams D, and as the wheel is turned edgewise the pivot L strikes against the same, and thus the wheel will be prevented from turning around only a certain distance.

Having thus fully described my invention, what I claim, and desire to secure by Letters Patent, is—

1. The pivot L, carrying the wind-wheel, in combination with the turn-table C, secured around the pivot, the horizontal beams D, attached to the turn-table, the fan-tail or vane mounted in the outer ends of the beams, a track or tracks attached to the beams, and a wheel or wheels carried by the pivot to run on the track, as set forth.

2. The pivot L, provided with a bracket, L', carrying the wind-wheel, in combination with the turn-table C, secured around the pivot, the beams D, secured to the turn-table, track B', attached to the beams, a fan-tail or vane mounted in the outer ends of the beams, and wheels A', carried by the bracket L', and working on the tracks B', as and for the purpose set forth.

3. In a windmill, the pivot L, working through the cap B and turn-table C, and provided with an arm or bracket, L', carrying a hanger, b, in which wheels A' are journaled, in combination with the beams D, having a track, B', secured thereon, the pivot being also provided with a wheel, C', which runs in a track, D', secured likewise to the beams, all arranged and operating for the purpose set forth.

4. In a windmill, the combination, with the frame or pivot L, carrying the wind-wheel, of the rock-shaft Y', a weighted lever, Y, connected to the same, and ropes wound on the rock-shaft and connecting with the pivot, and means for operating the lever to cause the winding of the ropes on the rock-shaft and turn the pivot, as set forth.

5. In a windmill, the combination, with the frame or pivot L, carrying the wind-wheel, of a rock-shaft, Y', ropes connecting with the pivot and wound in reverse directions on the rock-shaft, and means for operating the rock-shaft, as set forth.

6. In a windmill, the combination, with a pivot, L, of a rock-shaft, Y', carrying the drums at each end, and ropes wound in opposite direction upon the drums and connecting with the pivot, a weighted lever, Y, attached to the rock-shaft, a rope, X, connecting with the lever, and automatically-operating devices for drawing upon the rope as the speed increases, as set forth.

7. In a windmill, the combination, with the frame or pivot carrying the wind-wheel, of the rock-shaft Y', ropes wound on the latter and connecting with the frame or pivot, the upright shaft P, and the governor mechanism mounted on the shaft and set in motion thereby, and connecting with the rock-shaft, as set forth.

In testimony that I claim the foregoing as my own I have hereto affixed my signature in presence of two witnesses.

JOHN WARWICK.

Witnesses:
CON BUCKLEY,
J. G. WICKHAM.